United States Patent
Ligata et al.

(10) Patent No.: US 10,638,330 B2
(45) Date of Patent: Apr. 28, 2020

(54) SYSTEM AND THE RELATED METHOD FOR OPTIMIZING WI-FI COVERAGE IN A HOME NETWORK

(71) Applicant: Alcatel Lucent, Nozay (FR)

(72) Inventors: Amir Ligata, Antwerp (BE); Haris Gacanin, Antwerp (BE)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 16/099,086

(22) PCT Filed: May 22, 2017

(86) PCT No.: PCT/EP2017/062207
§ 371 (c)(1),
(2) Date: Nov. 5, 2018

(87) PCT Pub. No.: WO2017/207310
PCT Pub. Date: Dec. 7, 2017

(65) Prior Publication Data
US 2019/0150002 A1    May 16, 2019

(30) Foreign Application Priority Data
May 31, 2016   (EP) .................................... 16290097

(51) Int. Cl.
*H04W 16/26*    (2009.01)
*H04W 16/20*    (2009.01)
(Continued)

(52) U.S. Cl.
CPC .............. *H04W 16/26* (2013.01); *H04B 3/54* (2013.01); *H04B 17/318* (2015.01);
(Continued)

(58) Field of Classification Search
CPC ..... H04W 16/00; H04W 16/26; H04W 24/02; H04W 16/18; H04W 16/20; H04W 84/12; H04W 88/10
See application file for complete search history.

(56) References Cited

U.S. PATENT DOCUMENTS 9,781,608 B2    10/2017   Dore et al.
2011/0269397 A1*   11/2011   Bella .................. H04B 7/15507
                                                                    455/11.1
(Continued)

FOREIGN PATENT DOCUMENTS

JP    2012151845 A    8/2012
JP    2012519446 A    8/2012
(Continued)

OTHER PUBLICATIONS

Office Action dated Oct. 29, 2019, issued in corresponding Japanese Patent Application No. 2018-562512.
(Continued)

*Primary Examiner* — Mohamed A Kamara
(74) *Attorney, Agent, or Firm* — Harness, Dickey & Pierce, P.L.C.

(57) ABSTRACT

A system determines Wi-Fi coverage of the Wi-Fi extender located at a current location and at candidate locations in a home network; determines coverage of a power-line extender located at a power-line current location and at a power-line extender candidate location in the home network; and repositions the power-line extender to the power-line extender candidate location when the coverage exceeds coverage at the power-line current location.

11 Claims, 7 Drawing Sheets

(51) Int. Cl.
*H04B 17/318* (2015.01)
*H04B 3/54* (2006.01)
*H04W 24/02* (2009.01)

(52) U.S. Cl.
CPC ........... *H04W 16/20* (2013.01); *H04W 24/02* (2013.01); *H04B 2203/5441* (2013.01); *Y02D 70/10* (2018.01); *Y02D 70/14* (2018.01); *Y02D 70/142* (2018.01); *Y02D 70/168* (2018.01)

(56) References Cited

U.S. PATENT DOCUMENTS

2011/0274029 A1\* 11/2011 Connelly ............ H04W 12/003
370/315
2019/0215074 A1\* 7/2019 Vardarajan ......... H04B 7/15507

FOREIGN PATENT DOCUMENTS

| JP | 2014017646 A | 1/2014 |
|---|---|---|
| JP | 2014168133 A | 9/2014 |
| WO | WO-2004062305 A1 | 7/2004 |

OTHER PUBLICATIONS

International Search Report PCT/ISA/210 for International Application No. PCT/EP2017/062207 dated Aug. 25, 2017.
Qualcomm, "Qualcomm Hy-Fi Total Configuration Algorithm (TCA) for Hybrid Devices" published in Jan. 2013.
Korean Office Action dated Oct. 1, 2019 for corresponding Korean Application No. 10-2018-7037604.

\* cited by examiner

SYSTEM AND THE RELATED METHOD FOR OPTIMIZING WI-FI COVERAGE IN A HOME NETWORK

CROSS-REFERENCE TO RELATED APPLICATIONS

This application is national phase under 35 U.S.C. § 371 of PCT International Application No. PCT/EP2017/062207 which has an International filing date of May 22, 2017, which claims priority to European Application No. 16290097.1, filed May 31, 2016, the entire contents of each of which are hereby incorporated by reference.

TECHNICAL FIELD

The present invention relates to the field of home network diagnostic and troubleshooting. More particularly, the present invention relates to the field of Wi-Fi home network diagnostic and troubleshooting.

BACKGROUND

With the development of new applications and technologies, such as digital television, on-line gaming and home automation, Internet access must extend to various types of home devices, for example a set-top box, a game console, a home automation system, several desktops and laptops, etc. All these home devices are interconnected by means of a home network, such as a Wi-Fi network. To guarantee a uniform customer experience, also referred to as QoE, across the whole home network, care must be taken to enhance Wi-Fi coverage in the home networks.

Access points are deployed in such home networks in a random fashion across different rooms, different floors, different apartment blocks, etc. This results in interferences, contention, problems with load balancing, etc., but poor coverage remains one of the most severe problems encountered in home networks. Obstacles such as walls, stretched layouts and suboptimal placement of the access points in the home networks all give rise to a number of coverage holes in home networks. In addition to coverage holes, some areas of the home network might be poor reception zones where the end user's device hardly receives a Wi-Fi signal from an access point. The end user then experiences a poor performance and his QoE deteriorates.

Dense Wi-Fi deployment is one of the ways to significantly enhance Wi-Fi coverage and to thereby increase the customer QoE. For example, additional access points, such as for example Wi-Fi extender and Wi-Fi repeaters, are deployed in a home network in order to guarantee a uniform customer experience. The type and the location of these additional access points is manually chosen. Each additional access point indeed comprises an indicator being activated as soon as the additional access point enters a Wi-Fi coverage zone.

Several limitations remain coupled with dense Wi-Fi deployment. First, there exists to continuous nor remote monitoring of the link between the access points, the Wi-Fi extenders or repeaters, and the end devices. It could be that the Wi-Fi coverage in a home network changes as new obstacles arise and/or as layouts of the home network stretch. Additionally, the detection thresholds of the additional access points are predefined and cannot be tuned. Each provider of access point predefines a set of thresholds which might not be compatible with a set of thresholds of another provider. The indications provided by their indicators are instantaneous measurements that are not reflective of an average Wi-Fi coverage in the home network. Additionally, there exists no correlation between the indications and an expected Wi-Fi coverage. Finally, if the indicator malfunctions, an end user will not be able to determine if the access point malfunctions or if the Wi-Fi coverage is too weak.

Another proposed solution to increase the customer QoE is described in the white paper of Qualcomm entitled "Qualcomm Hy-Fi Total Configuration Algorithm (TCA) for Hybrid Devices" published in January 2013. This solution relies on hybrid networks where the access points of a home network adjust their parameters such that the Wi-Fi coverage is optimized and such that the interferences between access points are minimized. This approach is complex and extremely costly.

SUMMARY OF THE INVENTION

It is an objective to disclose a device and the related method that overcome the above identified shortcomings of existing solutions. More particularly, it is an objective to disclose a system for optimizing Wi-Fi coverage in a home network which deploys a simple and cost-efficient solution to guarantee a uniform customer experience.

According to a first aspect of the invention, the above defined objectives are realized by a system for optimizing Wi-Fi coverage in a home network comprising at least the system, an access point, a Wi-Fi extender and a power-line extender, the system comprising:

a Wi-Fi signal strength monitor adapted to monitor Wi-Fi signal strength between the access point and a current location of said Wi-Fi extender in the home network;

a Wi-Fi extender location optimizing module adapted to determine Wi-Fi coverage of the Wi-Fi extender located at the current location and located at candidate locations in the home network different from the current location when the Wi-Fi signal strength is below a predefined signal strength threshold; and a power-line extender location optimizing module adapted to:
 when the Wi-Fi coverage at all candidate locations is lower than the Wi-Fi coverage at the current location, determine coverage of the power-line extender located at power-line current location and located at a power-line extender candidate location in the home network different from the power-line current location;
 reposition the power-line extender to the power-line extender candidate location when the coverage exceeds coverage at the power-line current location.

The system according to the present invention optimizes Wi-Fi coverage in a home network. The system accounts the aggregated statistics on a network link between a current location of a Wi-Fi extender of the home network and an access point of the home network. In other words, the system according to the present invention takes into account parameters collected by an access point of the home network to optimize Wi-Fi coverage in the home network. The system further continuously monitors Wi-Fi coverage in a home network, thereby assessing Wi-Fi coverage on possible alternative locations of the Wi-Fi extender and possible alternative locations of the power-line extender, and recommending repositioning the Wi-Fi extender and/or the power-line extender when Wi-Fi coverage can be optimized. In other words, the system remotely investigates the quality of the link between a Wi-Fi extender and an access point and, through a number of logical steps, optimizes the location of the Wi-Fi extender. The optimization of Wi-Fi coverage in the home network is therefore centralized in the system according to the present invention. This minimizes the equipment needed to optimize Wi-Fi coverage in a home network.

In accordance with the present invention, Wi-Fi coverage comprises a wireless signal range and a wireless signal strength of the wireless signal emitted by an access point, while coverage relates to a contention factor, i.e. a number of neighbouring access points of the home network that are operating on the same or adjacent wireless channels and that are competing with the Wi-Fi extender for airtime. A home network according to the present invention is a type of local area network with the purpose to facilitate communication among digital devices present inside or within the close vicinity of a home. Devices capable of participating in this network, for example smart devices such as computers, tablets, smartphones, network printers and handheld mobile computers, often gain enhanced emergent capabilities through their ability to interact. The home network according to the present invention comprises the system according to the present invention, an access point, a Wi-Fi extender and a power-line extender. Alternatively, the home network according to the present invention comprises a plurality of access points, a plurality of Wi-Fi extenders, a plurality of power-line extenders, etc. An access point according to the present invention is a wireless access point, for example a networking hardware device that allows a Wi-Fi compliant device to connect to the home network. In accordance with the present invention, a wireless repeater, also referred to as a wireless range extender, is for example a networking hardware device that takes an existing signal from a wireless router or wireless access point and rebroadcasts it to create a second network. When two or more Wi-Fi compliant devices have to be connected with one another and the distance is too long for a direct connection to be established, a wireless repeater is used to bridge the gap, thereby improving Wi-Fi coverage within homes, buildings, offices, etc. According to the present invention, a power-line extender is for example a networking hardware device that uses electrical wiring to simultaneously carry both data, and Alternating Current electric power transmission or electric power distribution. Power-line communication is also referred to as power-line carrier, power-line digital subscriber line, mains communication, power-line telecommunications, or power-line networking. A candidate location of the Wi-Fi extender in the home network is different from the current location of the Wi-Fi extender in the home network and is to be understood as a location in the home network suitable for hosting the Wi-Fi extender. A power-line extender candidate location of the power-line extender in the home network is different from the current location of the power-line extender in the home network and is to be understood as a location in the home network suitable for hosting the power-line extender.

According to an optional aspect of the invention, the system further comprises a throughput assessing unit adapted to determine from the Wi-Fi signal strength an achievable throughput between the access point and the current location of the Wi-Fi extender.

This way, the system provides insight into the achievable performance of the link between the current location of the Wi-Fi extender and the access point in the home network. In other words, the system remotely investigates the quality of the link between a current location of the Wi-Fi extender and an access point and assesses an achievable throughput between the access point and the current location of the Wi-Fi extender based on remotely collected parameters collected by the access point without requiring an involvement of the end user.

According to an optional aspect of the invention, the system further comprises a location data collecting unit adapted to collect location data on the candidate locations and on the power-line extender candidate location.

This way, the system takes end-user data taken into account when optimizing Wi-Fi coverage in the home network. The location data on the candidate locations of the Wi-Fi extender in the home network and on the power-line extender candidate location of the power-line extender in the home network is collected from the end user device.

According to an optional aspect of the invention, the location data comprises one or more of the following:
   the Wi-Fi signal strength and a contention factor for each of the candidate locations;
   a power-line extender contention factor for the power-line extender candidate location.

A contention factor at a given location of the Wi-Fi extender comprises of a number of neighbouring access points that are operating on the same or adjacent wireless channels and are competing with the Wi-Fi extender for airtime. A contention factor at a given location of the power-line extender comprises of a number of neighbouring access points that are operating on the same or adjacent wireless channel and are competing with the power-line extender for airtime.

According to an optional aspect of the invention, the Wi-Fi extender location optimizing module is further adapted to:
   receive location data on the candidate locations from the location data collecting unit;
   determine from the Wi-Fi signal strength a signal quality score for the current location;
   determine from the location data a signal quality score for each of the candidate locations;
   compare each of the signal quality scores to a predefined quality score threshold;
   select a selected location for which the signal quality score complies with the predefined quality score threshold and for which the signal quality score is above the signal quality score for the current location; and
   reposition the Wi-Fi extender to the selected location;
and wherein the throughput assessing unit is further adapted to determine an achievable throughput between the access point and the selected location.

A signal quality score is indicative for the quality of Wi-Fi coverage at a given location of the Wi-Fi extender in the home network. The Wi-Fi extender location optimizing module takes the location data remotely collected from the network devices into account when determining a signal quality score for a current location of the Wi-Fi extender. Additionally, the Wi-Fi extender location optimizing module takes the location data remotely collected from the network devices into account when determining a signal quality score for a candidate location of the Wi-Fi extender. When the signal quality score of a candidate location of the Wi-Fi extender is higher than the signal quality score of the current location of the Wi-Fi extender, the Wi-Fi extender location optimizing module repositions the Wi-Fi extender to the candidate location to optimize Wi-Fi coverage in the home network. In other words, the Wi-Fi extender location optimizing module is adapted to identify if there exists a candidate location of the Wi-Fi extender for which the Wi-Fi coverage in the home network is optimized, and to relocate the Wi-Fi extender to this candidate location if this is the case.

According to an optional aspect of the invention, the power-line extender location optimizing module is further adapted to:

receive location data on the power-line candidate location from the location data collecting unit;

determine a contention factor for the power-line current location;

determine from the location data a power-line contention factor for the power-line extender candidate location; and compare the power-line contention factor for the power-line extender candidate location to the power-line contention factor for the power-line current location; and select a selected power-line extender location for which the power-line contention factor is lower than the power-line contention factor for the power-line current location; and reposition the power-line extender to the selected power-line extender location;

and wherein the throughput assessing unit is further adapted to determine an achievable throughput between the access point and the selected power-line extender location.

A power-line contention factor is indicative for the quality of coverage at a given location of the power-line extender in the home network. The power-line extender location optimizing module takes the location data remotely collected from the network devices into account when determining a power-line contention factor for a current location of the power-line extender. Additionally, the power-line extender location optimizing module takes the location data remotely collected from the network devices into account when determining a power-line contention factor for a power-line extender candidate location of the power-line extender. When the power-line contention factor of a power-line extender candidate location of the power-line extender is lower than the power-line contention factor of the power-line current location of the power-line extender, the power-line extender location optimizing module repositions the power-line extender to the power-line extender candidate location to optimize Wi-Fi coverage in the home network. In other words, the power-line extender location optimizing module is adapted to identify if there exists a power-line extender candidate location of the power-line extender for which the coverage in the home network is optimized, and to relocate the power-line extender to this power-line extender candidate location if this is the case.

According to an optional aspect of the invention, the Wi-Fi extender location optimizing module is further adapted to:

determine a scaled contention factor from the location data for the current location and for each of the candidate locations;

for each of the candidate locations and for the current location, subtract the scaled contention factor from said Wi-Fi signal strength, thereby determining the signal quality score;

for each of the candidate locations and for the current location, determine an argument of the maxima of the signal quality score;

for each of the candidate locations, compare the Wi-Fi signal strength to the predefined quality score threshold; and select the selected location for which said Wi-Fi signal strength is higher than the predefined quality score threshold and with the highest argument of the maxima.

This way, both the Wi-Fi signal strengths and the contention factor are taken into account when determining if a candidate location in the home network with higher Wi-Fi coverage exists.

According to an optional aspect of the invention, the Wi-Fi coverage of the Wi-Fi extender comprises the signal quality score.

According to an optional aspect of the invention, the coverage of the power-line extender comprises the power-line contention factor.

According to a second aspect of the invention, there is provided a method for optimizing Wi-Fi coverage in a home network comprising at least an access point, a Wi-Fi extender and a power-line extender, the method comprising the steps of:

monitoring Wi-Fi signal strength between the access point and a current location of the Wi-Fi extender in the home network;

determining Wi-Fi coverage of the Wi-Fi extender located at the current location and located at candidate locations in the home network different from the current location when the Wi-Fi signal strength is below a predefined signal strength threshold; and when the Wi-Fi coverage at all candidate locations is lower than the Wi-Fi coverage at the current location, determining coverage of the power-line extender located at power-line current location and located at a power-line extender candidate location in the home network different from the power-line current location;

repositioning the power-line extender to the power-line extender candidate location when the coverage exceeds coverage at the power-line current location.

The method according to the present invention optimizes Wi-Fi coverage in a home network. The method accounts the aggregated statistics on a network link between a current location of a Wi-Fi extender of the home network and an access point of the home network and between a current location of a power-line extender of the home network and an access point of the home network. In other words, the method according to the present invention takes into account parameters collected by an access point of the home network to optimize Wi-Fi coverage in the home network. The method further continuously monitors Wi-Fi coverage in a home network, thereby assessing Wi-Fi coverage on possible alternative locations of the Wi-Fi extender and possible alternative locations of the power-line extender, and recommending repositioning the Wi-Fi extender and/or the power-line extender when Wi-Fi coverage can be optimized. In other words, the method remotely investigates the quality of the link between a Wi-Fi extender and an access point and, through a number of logical steps, optimizes the location of the Wi-Fi extender. The optimization of Wi-Fi coverage in the home network is therefore centralized. This minimizes the equipment needed to optimize Wi-Fi coverage in a home network.

The current invention in addition also relates to a computer program comprising software code adapted to perform the method according to the present invention.

The invention further relates to a computer readable storage medium comprising the computer program according to the present invention.

DETAILED DESCRIPTION OF EMBODIMENT(S)

Figure 1:
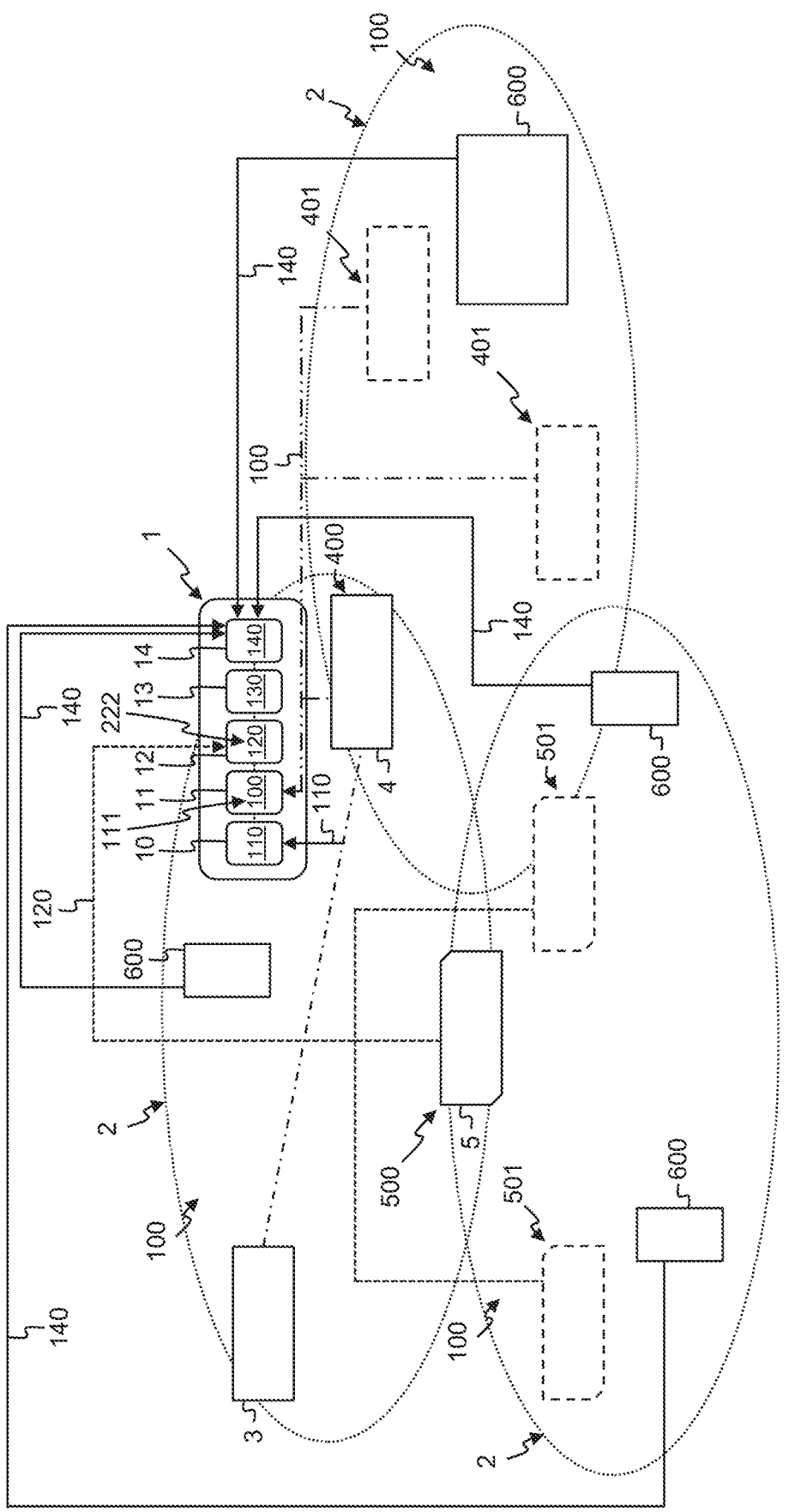
FIG. 1 schematically illustrates an embodiment of a system according to the present invention.

According to an embodiment shown in FIG. 1, a home network 2 comprises at least a system 1, an access point 3, a Wi-Fi extender 4, a power-line extender 5 and four networking devices 600 comprising wireless connectivity. The networking devices 600 are for example computers, laptops, smartphones, tablets, smart televisions, smart printers, etc. The home network 2 may comprise a plurality of access points 3, of Wi-Fi extenders 4, of power-line extenders 5 and/or of networking devices 600. The Wi-Fi extender 4 is located at a current location 400 in the home network 2. The power-line extender 5 is located at a power-line current location 500 in the home network 2. The home network 2 comprises a plurality of candidate locations 401 for the Wi-Fi extender 4 different from the current location 400. The home network 2 comprises a plurality of power-line extender candidate locations 501 for the power-line extender 5 different from the power-line current location 500. The system 1 comprises a Wi-Fi signal strength monitor 10, a Wi-Fi extender location optimizing module 11, a power-line extender location optimizing module 12, a throughput assessing unit 13 and a location data collecting unit 14. The location data collecting unit 14 collects location data 140 on the potential locations 401 and on the power-line extender candidate locations 501 from the networking devices 600. The location data 140 comprises one or more of the following: Wi-Fi signal strength 110 and a contention factor for each of the candidate locations 401, a power-line extender contention factor for the power-line extender candidate locations 501. The Wi-Fi signal strength monitor 10 monitors Wi-Fi signal strength 110 between the access point 3 and the Wi-Fi extender 4 at its current location 400. The Wi-Fi signal strength monitors 10 determines if the Wi-Fi signal strength 110 is below a predefined signal strength threshold. When the Wi-Fi signal strength 110 is above the predefined signal strength threshold at the current location 400, the throughput assessing unit 13 determines an achievable throughput 130 between the access point 3 and the current location 400. When the Wi-Fi signal strength 110 is below the predefined signal strength threshold, the Wi-Fi extender location optimizing module 11 determines Wi-Fi coverage 100 of the Wi-Fi extender 4 located at the current location 400 and located at candidate locations 401. Wi-Fi coverage 100 comprises a signal quality score 111. The Wi-Fi extender location optimizing module 11 receives the location data 140 on the candidate locations 401 from the location data unit 14. The Wi-Fi extender location optimizing module 11 determines from the location data 140 and particularly from the Wi-Fi signal strength 110 a scaled contention factor for the current location 400 and for each of the candidate locations 401. For the current location 400 and each of the candidate locations 401, the Wi-Fi extender location optimizing module 11 subtracts the scaled contention factor from the Wi-Fi signal strength 110, thereby determining a signal quality score 111 for the current location 400 of the Wi-Fi extender 400 and a signal quality score 111 for each of the candidate locations 401 in the home network 2. For the current location 400 and for each of the candidate locations 401, the Wi-Fi extender location optimizing module 11 determines an argument of the maxima of the signal quality score 111. For each of the potential locations 401, the Wi-Fi extender location optimizing module 11 compares the Wi-Fi signal strength 110 to a predefined quality score threshold. The Wi-Fi extender location optimizing module 11 then selects a selection location 402 for which the Wi-Fi signal strength 110 is higher than the predefined quality score threshold and for which the signal quality score 111 is above the signal quality score 111 for the current location 400, i.e. the candidate location 401 with the highest argument of the maxima of the signal quality score 111. The Wi-Fi extender location optimizing module 11 then repositions the Wi-Fi extender 4 to the selected location 402. The throughput assessing unit 13 then determines an achievable throughput 130 between the access point 3 and the selected location 402. When Wi-Fi coverage 100 at all candidate locations 401 is lower than Wi-Fi coverage 100 at the current location 400, the power-line extender location optimizing module 12 determines coverage 120 of the power-line extender 5 located at the power-line current location 500 and located at a power-line extender candidate location 501. Coverage 120 comprises a power-line contention factor 222. The power-line extender location optimizing module 12 receives location data 140 on the power-line extender candidate locations 501 from the data collecting unit 14. The power-line extender location optimizing module 12 then determines a power-line contention factor 222 for the power-line current location 500, and a power-line contention factor 222 for the power-line extender candidate location 501. The power-line extender location optimizing module 12 compares the power-line contention factor 222 for the power-line extender candidate location 501 to the power-line contention factor 222 for the power-line current location 500 and selects a selected power-line location 502 for which the power-line contention factor 222 is lower than the power-line contention factor 222 for the power-line current location 500. The power-line extender location optimizing module 12 then repositions the power-line extender 5 to the selected power-line location 502. The throughput assessing unit 13 then determines an achievable throughput 130 between the access point 3 and the power-line selected location 502.

Figure 2:
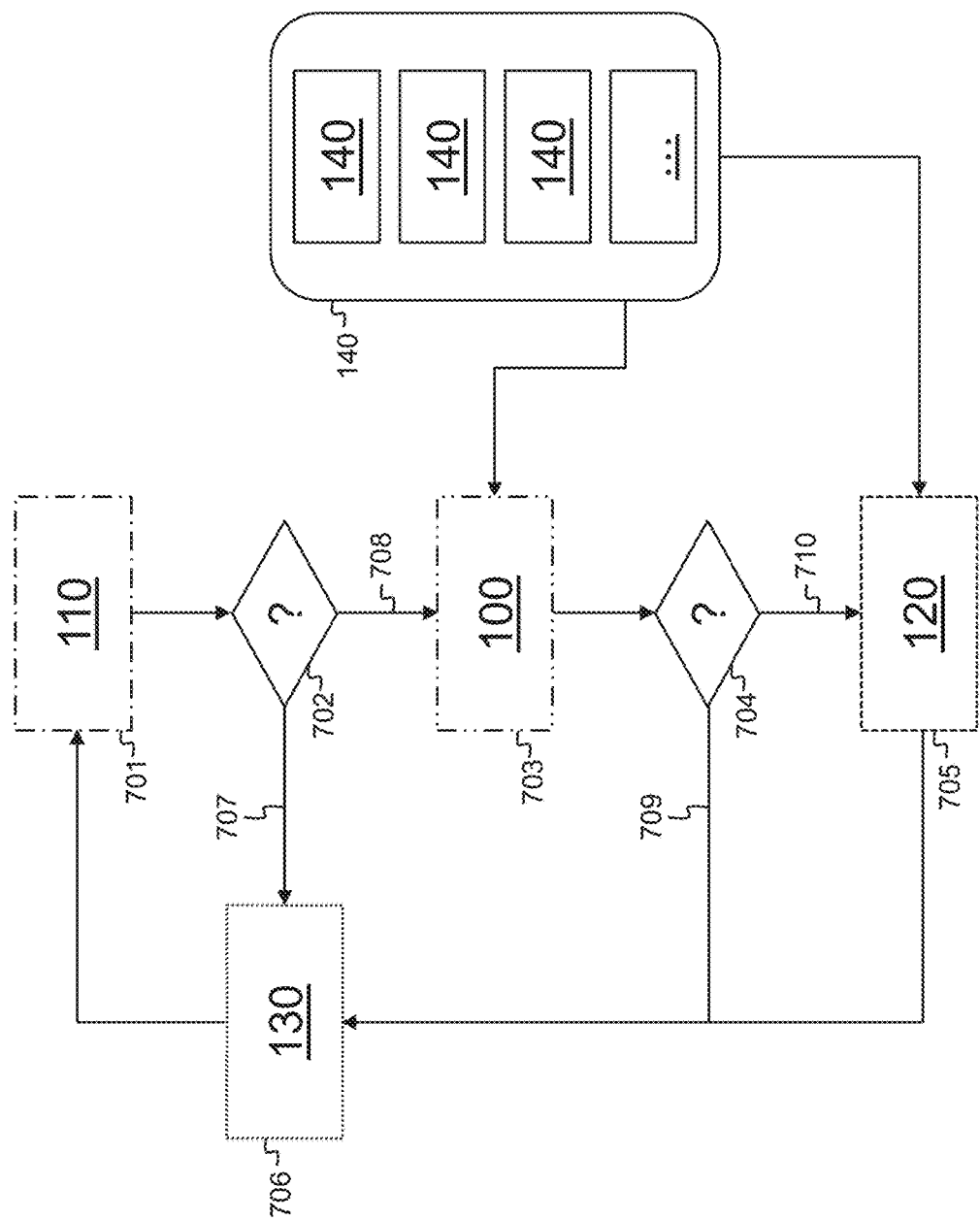
FIG. 2 schematically illustrates an embodiment of the steps of the method according to the present invention with which Wi-Fi coverage is optimized in a home network.

According to an embodiment shown in FIG. 2, the method according to the present invention for optimizing Wi-Fi coverage 100 in a home network 2 comprising at least an access point 3, a Wi-Fi extender 4 and a power-line extender 5, comprises seven steps. In step 701, a Wi-Fi signal strength 110 between the access point 3 and a current location 400 of the Wi-Fi extender 4 in the home network 2 is monitored. The Wi-Fi signal strength 110 is compared to a predefined signal strength threshold in step 702. When the Wi-Fi signal strength 110 is above the predefined signal strength threshold in result 707, an achievable throughput 130 between the access point 3 and the current location 400 of the Wi-Fi extender 4 is determined from the Wi-Fi signal strength 110. When the Wi-Fi signal strength 110 is below the predefined signal strength threshold in result 708, Wi-Fi coverage 100 of the Wi-Fi extender 4 is determined in step 703 at the current location 400 and at candidate locations 401 in the home network 2 different from the current location 400. Wi-Fi coverage 100 on the current location 400 and on the candidate locations 401 is determined from location data 140 collected from networking devices of the home network 2. In step 704, Wi-Fi coverage 100 of the Wi-Fi extender 4 located at each candidate locations 401 is compared to Wi-Fi coverage 100 of the Wi-Fi extender 4 located at the current location 400. When Wi-Fi coverage 100 at a candidate location 401 is higher than Wi-Fi coverage 100 at the current location 400 in result 709, an achievable throughput 130 between the access point 3 and this potential location 401 of the Wi-Fi extender 4 is determined from the Wi-Fi signal strength 110. When Wi-Fi coverage 100 at all candidate locations 401 is lower than Wi-Fi coverage 100 at the current location 400 in result 710, coverage 120 of the power-line extender 5 located at a power-line current location 500 and located at a power-line extender candidate location 501 in the home network 2 is determined in step 705. When coverage 120 at the power-line extender candidate location 501 exceeds coverage 120 at the power-line current location 500, the power-line extender is repositioned to this power-line extender candidate location 501.

Figure 3:
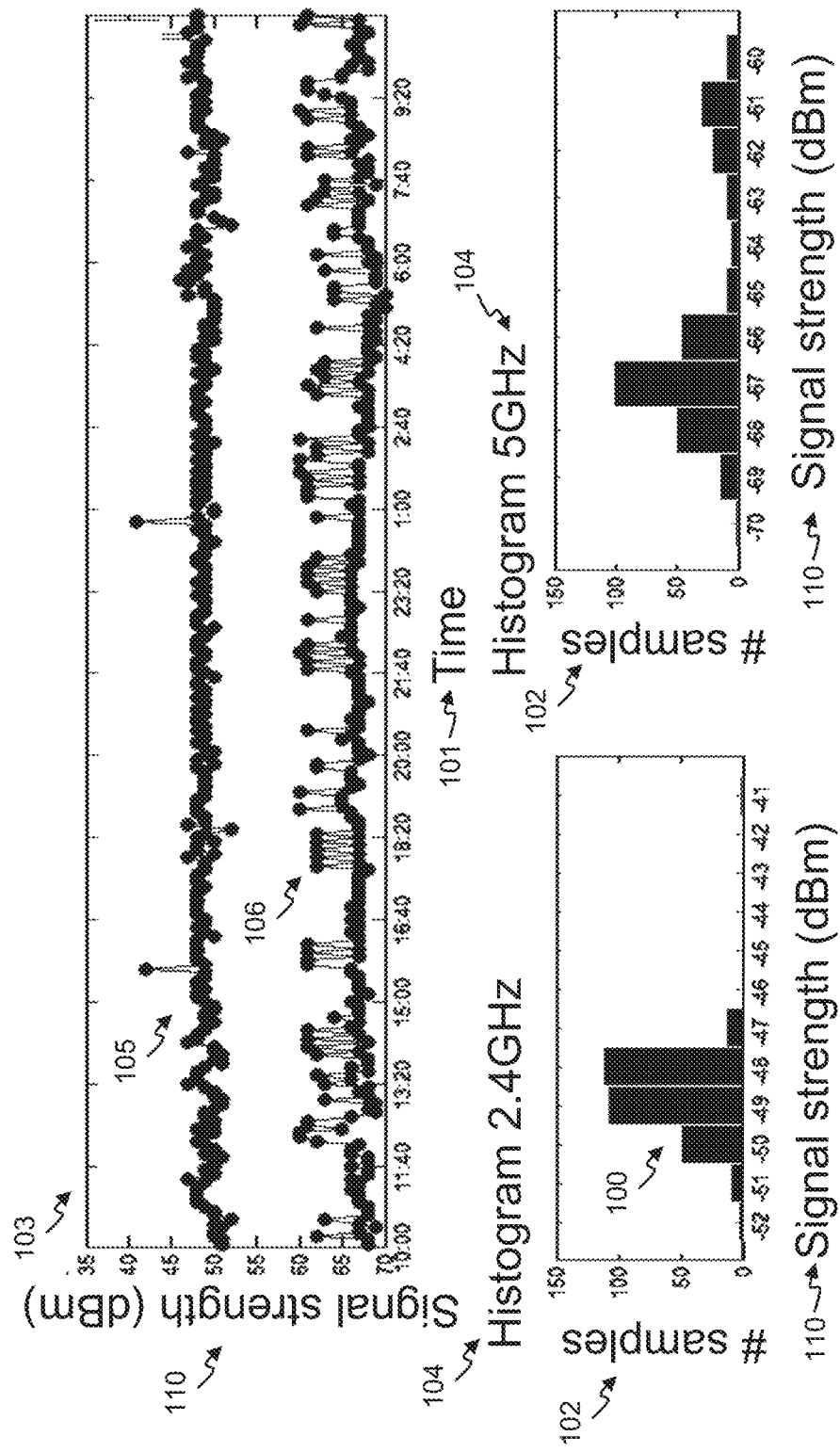
FIG. 3 schematically illustrates results of a positive Wi-Fi coverage test for a Wi-Fi extender of a home network.

Plot 103 of FIG. 3 schematically represents a distribution of Wi-Fi signal strengths 110 between an access point and a Wi-Fi extender in a home network over time 101. The graph 105 represents the Wi-Fi signal of the access point at 2.4 GHz, while the graph 106 represents the Wi-Fi signal of the access point at 5 GHz. The plot 104 of FIG. 3 schematically illustrates a number of samples 102 at 2.4 GHz of the Wi-Fi signal strength 110. 80% of the number of samples 102 of the Wi-Fi signal strength 110 at 2.4 GHz is higher than a predefined signal strength threshold equal to −55 dBm in FIG. 3. The location of the Wi-Fi extender is therefore not modified, and an achievable throughput can then be calculated from the Wi-Fi signal strength 110 at 2.4 GHz. According to an alternative embodiment, the amount of samples 102 of the Wi-Fi signal strength 110 that is required to comply with the predefined signal strength threshold is higher than 80%.

Figure 4:
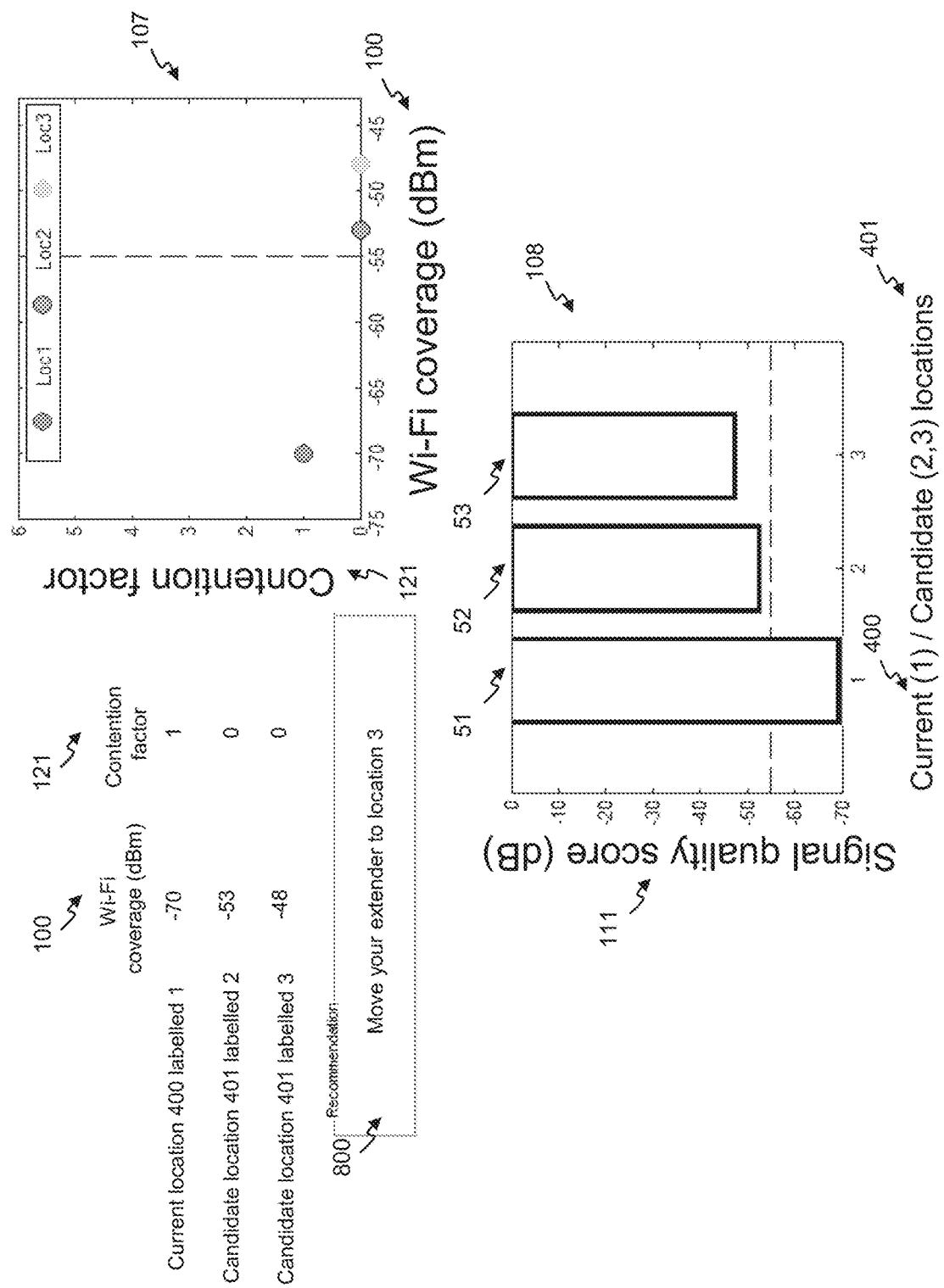
FIG. 4 schematically illustrates a positive selection of a selected location for a Wi-Fi extender of a home network.

FIG. 4 schematically illustrates Wi-Fi coverage 100 and a contention factor 121 for a current location 400 labelled 1 of a Wi-Fi extender in a home network and for two candidate locations 401 labelled 2 and 3 of the Wi-Fi extender in the home network. Plot 107 of FIG. 4 represents Wi-Fi coverage 100 in function of a contention factor 121 for the current location 400 labelled 1 and for the two candidate locations 401 labelled 2 and 3. Plot 108 of FIG. 4 represents a signal quality score 111 for the current location 400 labelled 1 and for each of the candidate locations 401 labelled 2 and 3 of the Wi-Fi extender in the home network. The signal quality score 111 labelled 51 of current location 400 labelled 1 and the signal quality score 111 labelled 52 of candidate location 401 labelled 2 are lower than the signal quality score 111 labelled 53 of potential location 401 labelled 3. Therefore, recommendation 800 states to reposition the Wi-Fi extender to candidate location 401 labelled 3. The potential location 401 labelled 3 then becomes the selected location for the Wi-Fi extender.

Figure 5:
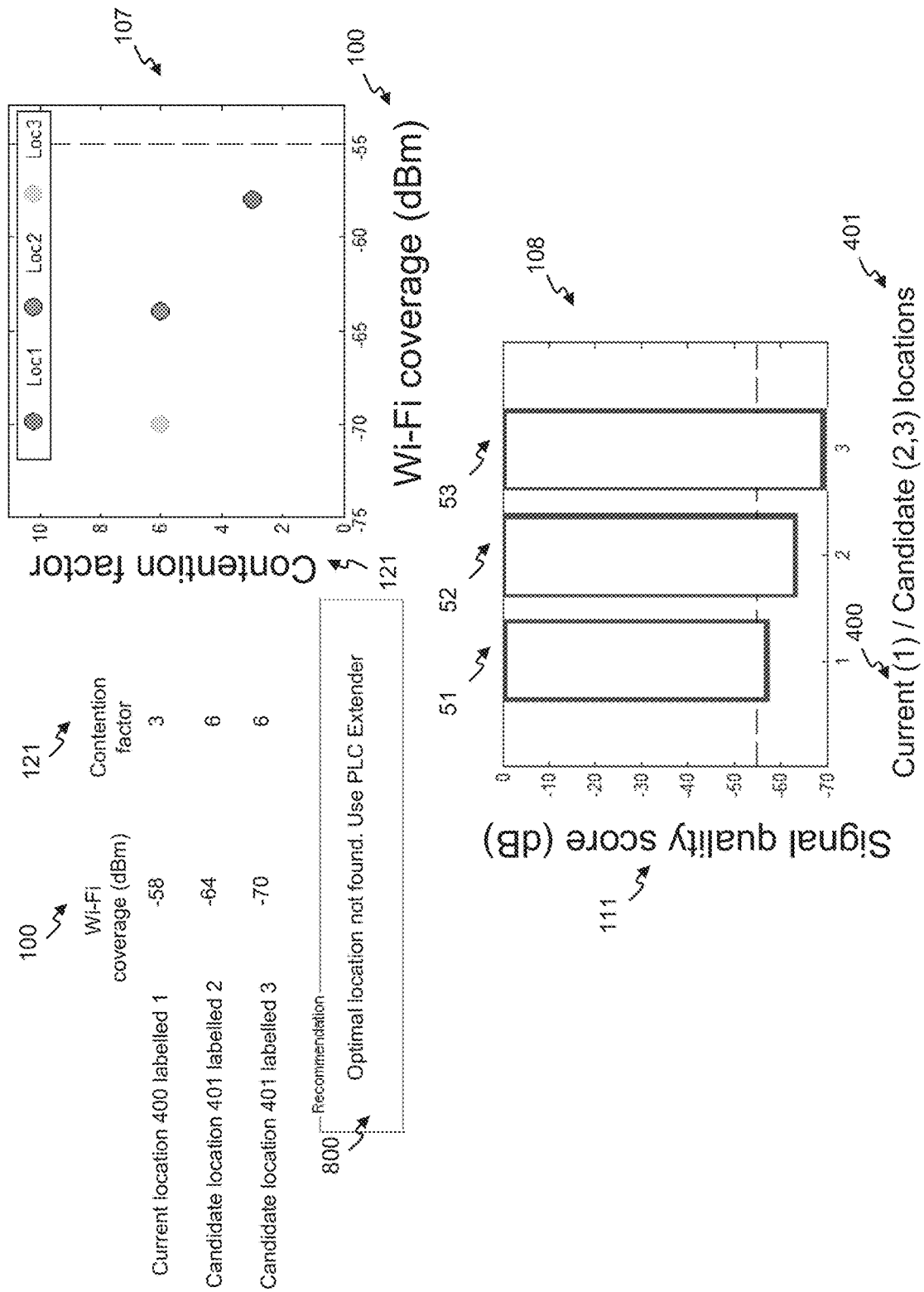
FIG. 5 schematically illustrates a test wherein no selected location for a Wi-Fi extender of a home network exists.

FIG. 5 schematically illustrates Wi-Fi coverage 100 and a contention factor 121 for a current location 400 labelled 1 of a Wi-Fi extender in a home network and for two candidate locations 401 labelled 2 and 3 of the Wi-Fi extender in the home network. Plot 107 of FIG. 5 represents Wi-Fi coverage 100 in function of a contention factor 121 for the current location 400 labelled 1 and for the two candidate locations 401 labelled 2 and 3. Plot 108 of FIG. 5 represents a signal quality score 111 for the current location 400 labelled 1 and for each of the candidate locations 401 labelled 2 and 3 of the Wi-Fi extender in the home network. The signal quality score 111 labelled 51 of current location 400 labelled 1 is higher than the signal quality score 111 labelled 52 of candidate location 401 labelled 2 and higher than the signal quality score 111 labelled 53 of candidate location 401 labelled 3. Therefore, recommendation 800 states that no optimal potential location 401 has been determined for the Wi-Fi extender in the home network, and that a power-line extender of the home network must be repositioned.

Figure 6:
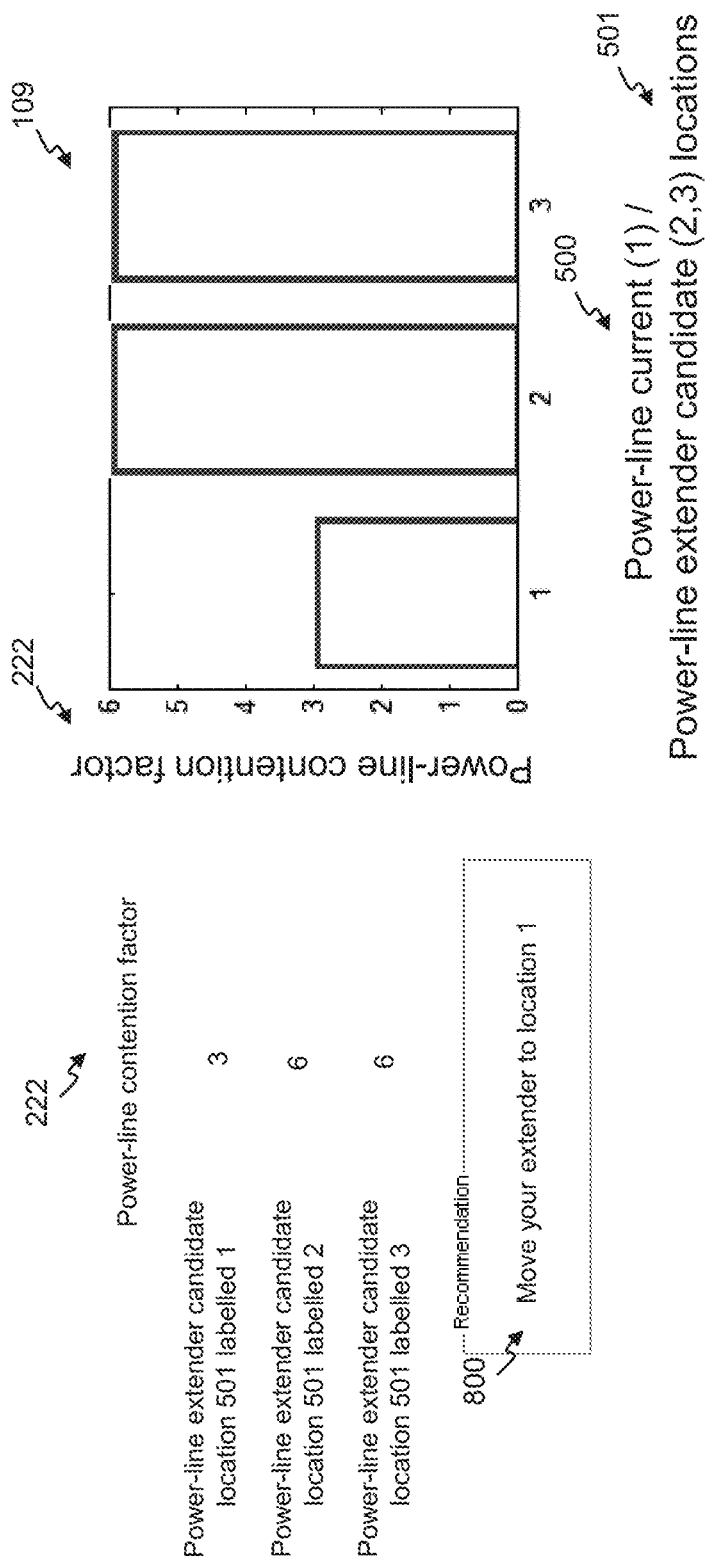
FIG. 6 schematically illustrates a positive selection of a selected power-line location for a power-line extender of a home network.

FIG. 6 schematically illustrates a power-line contention factor 222 for a current location 500 labelled 1 of a power-line extender in a home network and for two power-line extender candidate locations 501 labelled 2 and 3 of the power-line extender in the home network. Plot 109 of FIG. 6 represents the power-line contention factor 222 for the power-line current location 500 labelled 1 and for each of the power-line extender potential locations 501 labelled 2 and 3 of the power-line extender in the home network. The power-line contention factor 222 for the power-line current location 500 labelled 1 is lower than the power-line contention factor 222 for the power-line extender candidate locations 501 labelled 2 and 3. Therefore, recommendation 800 states that the power-line extender of the home network must be at the power-line current location 500 labelled 1. The power-line extender current location 500 labelled 1 then becomes the power-line selected location for the power-line extender.

Figure 7:
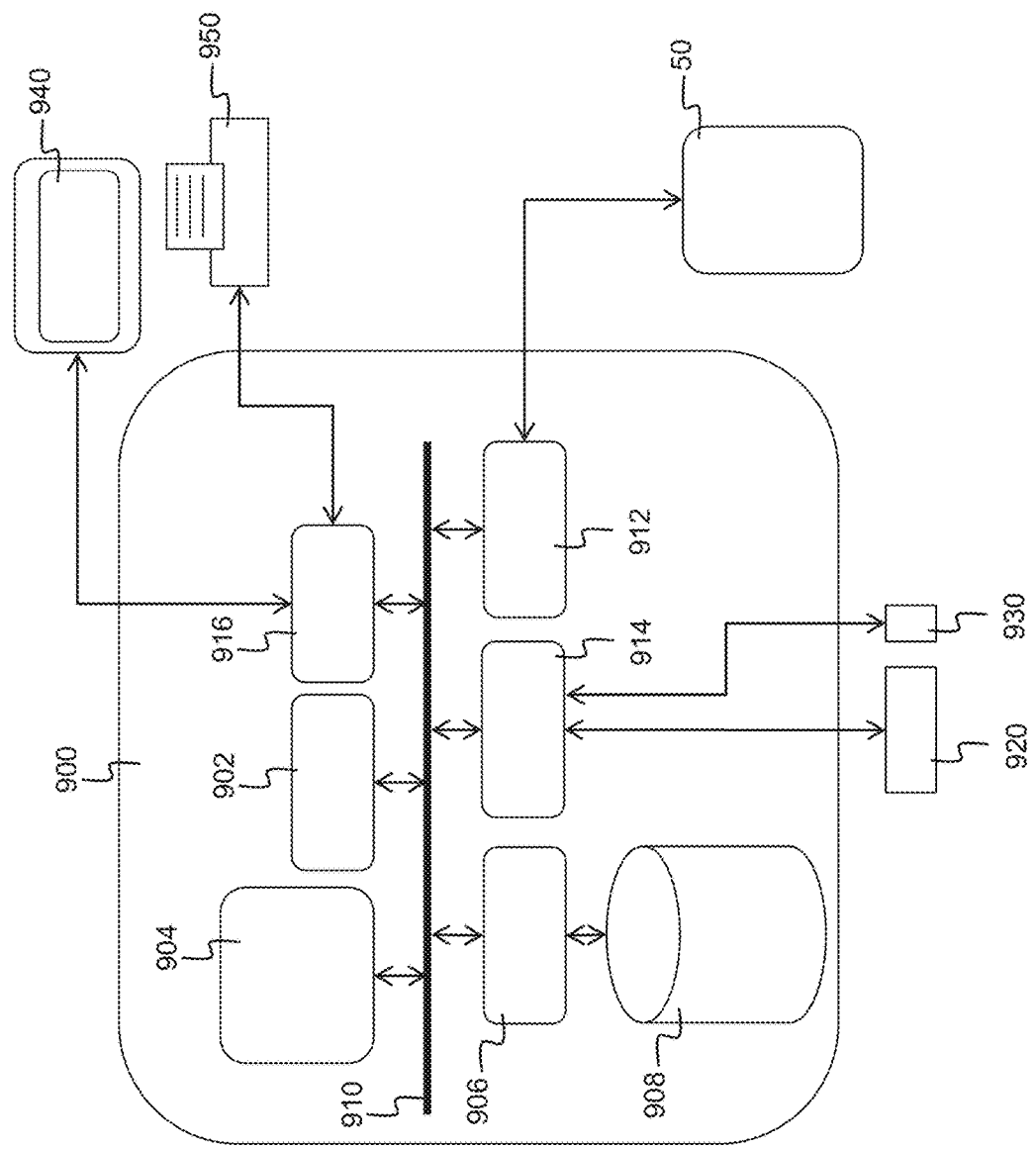
FIG. 7 schematically illustrates a suitable computing system for hosting the system of FIG. 1.

FIG. 7 shows a suitable computing system 800 for hosting the system 1 of FIG. 1. Computing system 900 may in general be formed as a suitable general purpose computer and comprise a bus 910, a processor 902, a local memory 904, one or more optional input interfaces 914, one or more optional output interfaces 916 a communication interface 912, a storage element interface 506 and one or more storage elements 908. Bus 910 may comprise one or more conductors that permit communication among the components of the computing system. Processor 902 may include any type of conventional processor or microprocessor that interprets and executes programming instructions. Local memory 904 may include a random access memory (RAM) or another type of dynamic storage device that stores information and instructions for execution by processor 902 and/or a read only memory (ROM) or another type of static storage device that stores static information and instructions for use by processor 904. Input interface 914 may comprise one or more conventional mechanisms that permit an operator to input information to the computing device 900, such as a keyboard 920, a mouse 930, a pen, voice recognition and/or biometric mechanisms, etc. Output interface 916 may comprise one or more conventional mechanisms that output information to the operator, such as a display 940, a printer 950, a speaker, etc. Communication interface 912 may comprise any transceiver-like mechanism such as for example two 1 Gb Ethernet interfaces that enables computing system 900 to communicate with other devices and/or systems, for example mechanisms for communicating with one or more other computing systems 50. The communication interface 912 of computing system 900 may be connected to such another computing system by means of a local area network (LAN) or a wide area network (WAN, such as for example the internet, in which case the other computing system 980 may for example comprise a suitable web server. Storage element interface 906 may comprise a storage interface such as for example a Serial Advanced Technology Attachment (SATA) interface or a Small Computer System Interface (SCSI) for connecting bus 910 to one or more storage elements 908, such as one or more local disks, for example 1 TB SATA disk drives, and control the reading and writing of data to and/or from these storage elements 908. Although the storage elements 908 above is described as a local disk, in general any other suitable computer-readable media such as a removable magnetic disk, optical storage media such as a CD or DVD, -ROM disk, solid state drives, flash memory cards, . . . could be used. The system 900 described above can also run as a Virtual Machine above the physical hardware.

The system 1 of FIG. 1 can be implemented as programming instructions stored in local memory 904 of the computing system 900 for execution by its processor 902. Alternatively system 1 of FIG. 1 could be stored on the storage element 908 or be accessible from another computing system 50 through the communication interface 912.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s described or illustrated above.

The invention claimed is:

1. A system, comprising:
    at least one processor configured to executed instructions stored in a memory such that the at least one processor is configured to,
        monitor Wi-Fi signal strength between an access point and a current location of a Wi-Fi extender in a home network;
        determine Wi-Fi coverage of said Wi-Fi extender located at said current location and located at candidate locations in said home network different from said current location when said Wi-Fi signal strength is below a signal strength threshold; and
        when said Wi-Fi coverage at all candidate locations is lower than said Wi-Fi coverage at said current location, determine coverage of a power-line extender located at a power-line current location and located at a power-line extender candidate location different in said home network from said power-line current location; and
        reposition said power-line extender to said power-line extender candidate location when said coverage exceeds coverage at said power-line current location.

2. The system according to claim 1, wherein said at least one processor is configured to determine from said Wi-Fi signal strength an achievable throughput between said access point and said current location of said Wi-Fi extender.

3. The system according to claim 1, wherein said at least one processor is configured to collect location data on said candidate locations and on said power-line extender candidate location.

4. The system according to claim 3, wherein said location data comprises one or more of the following:
    said Wi-Fi signal strength and a contention factor for each of said candidate locations;
    a power-line extender contention factor for said power-line extender candidate location.

5. The system according to claim 3, wherein said at least one processor is further configured to:
    receive location data on said candidate locations;
    determine from said Wi-Fi signal strength a signal quality score for said current location;
    determine from said location data a signal quality score for each of said candidate locations;
    compare each of said signal quality scores to a quality score threshold;
    select a selected location for which said signal quality score complies with said quality score threshold and for which said signal quality score is above said signal quality score for said current location; and
    reposition said Wi-Fi extender to said selected location;
    and wherein said at least one processor is further configured to determine an achievable throughput between said access point and said selected location.

6. The system according to claim 3, wherein said at least one processor is further configured to:
    receive location data on said power-line extender candidate location;
    determine a power-line contention factor for said power-line current location;
    determine from said location data a power-line contention factor for said power-line extender candidate location; and
    compare said power-line contention factor for said power-line extender candidate location to said power-line contention factor for said power-line current location; and
    select a selected power-line location for which said power-line contention factor is lower than said power-line contention factor for said power-line current location; and
    reposition said power-line extender to said selected power-line location;
    and wherein said at least one processor is further configured to determine an achievable throughput between said access point and said selected power-line location.

7. The system according to claim 5 wherein said at least one processor is further configured to:

determine a scaled contention factor from said location data for said current location and for each of said candidate locations;

for each of said candidate locations and for said current location, subtract said scaled contention factor from said Wi-Fi signal strength, thereby determining said signal quality score;

for each of said candidate locations and for said current location, determine an argument of the maxima of said signal quality score;

for each of said candidate locations, compare said Wi-Fi signal strength to said quality score threshold; and select said selected location for which said Wi-Fi signal strength is higher than said quality score threshold and with the highest argument of the maxima.

8. The system according to claim 7 wherein said Wi-Fi coverage of said Wi-Fi extender comprises said signal quality score.

9. The system according to claim 6, wherein said coverage of said power-line extender comprises said power-line contention factor.

10. A method home, comprising:

monitoring Wi-Fi signal strength between an access point and a current location of a Wi-Fi extender in a home network;

determining, by at least one processor, Wi-Fi coverage of said Wi-Fi extender located at said current location and located at candidate locations in said home network different from said current location when said Wi-Fi signal strength is below a predefined signal strength threshold; and when said Wi-Fi coverage at all candidate locations is lower than said Wi-Fi coverage at said current location, determining coverage of a power-line extender located at power-line current location and located at a power-line extender candidate location in said home network different from said power current location;

repositioning said power-line extender to said power-line extender candidate location when said coverage exceeds coverage at said power-line current location.

11. A non-transitory computer readable storage medium storing computer-executable instructions which, when executed by at least one processor, perform a method according to claim 10.

* * * * *